(12) United States Patent
Prickett

(10) Patent No.: US 6,195,769 B1
(45) Date of Patent: Feb. 27, 2001

(54) FAILSAFE ASYNCHRONOUS DATA TRANSFER CORRUPTION INDICATOR

(75) Inventor: John M. Prickett, Manchaca, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/105,541

(22) Filed: Jun. 26, 1998

(51) Int. Cl.[7] ............................................. G06F 13/42
(52) U.S. Cl. ......................... 714/49; 710/51; 710/129
(58) Field of Search ................................. 714/798, 731, 714/811, 814, 49, 746; 710/29, 58, 61, 126, 129, 130, 51; 713/400, 500

(56) References Cited

U.S. PATENT DOCUMENTS

| | | | |
|---|---|---|---|
| 4,839,893 | * 6/1989 | Smith | 370/506 |
| 4,965,794 | * 10/1990 | Smith | 370/506 |
| 5,125,089 | 6/1992 | McCambridge | 395/550 |
| 5,524,218 | * 6/1996 | Byers et al. | 710/129 |
| 5,537,557 | 7/1996 | Briffett et al. | 395/309 |
| 5,592,629 | 1/1997 | Gamble | 395/250 |
| 5,621,743 | * 4/1997 | Tomisawa | 714/746 |

OTHER PUBLICATIONS

*Metastable Response in 5–V Logic Circuits*, Texas Instruments Incorporated, SDYA006, Copyright © Feb. 1997, pp. i–iv, 1–12.

*Octal D–Type Edge–Triggered Filp–Flop with 3–State Outputs*, Texas Instruments Incorporated, Copyright © 1996, pp. 1–6.

*Octal Transparent D–Type Latch with 3–State Outputs*, Texas Instruments Incorporated, Copyright © 1996, pp. 1–6.

* cited by examiner

*Primary Examiner*—Ly V. Hua
(74) *Attorney, Agent, or Firm*—Akin, Gump, Strauss, Hauer & Feld, L.L.P.

(57) ABSTRACT

A data corruption indicator circuit for providing error free data transfer between a first device and a second device, clocked by different clock signals, is implemented. The data corruption indicator circuit can allow for faster throughput than the described prior art and provides a circuitry for detecting corrupt data. The data corruption indicator circuit provides a clocked data ready signal that updates a status lip-flop and a delayed data ready signal that updates a plurality of data flip-flops and a potential corruption flip-flop. Additionally, the delayed data ready signal may be used as an interrupt signal to notify the second device that data is available for transfer. The delay between the clocked data ready signal and the delayed data ready signal is such that a hazard cannot exist for the data signal and the status signal simultaneously. The failsafe nature of the invention is that while the status signal may indicate corrupt data when the data is actually valid, it will not indicate valid data when the data is corrupt.

21 Claims, 3 Drawing Sheets

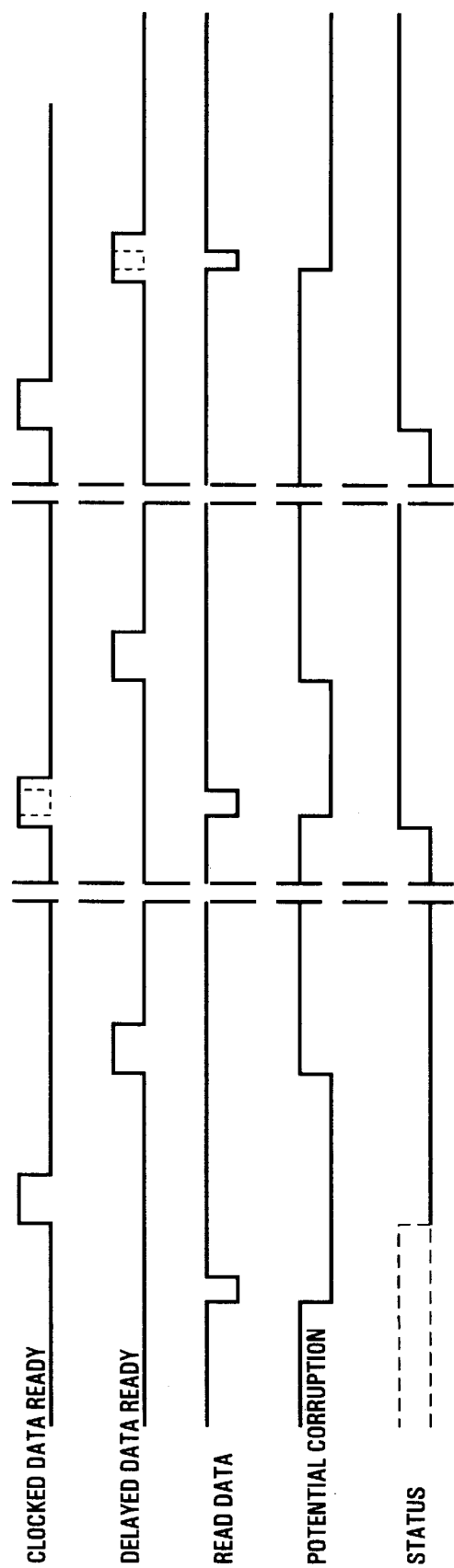

FAILSAFE ASYNCHRONOUS DATA TRANSFER CORRUPTION INDICATOR

BACKGROUND OF THE INVENTION

1. Field of the Invention

The present invention relates to transfer of data in an electronic system, and more particularly to a method and an apparatus for determining when data transferred between electronic devices that are clocked by different clock signals is corrupt.

2. Description of the Related Art

When an electronic device running at one clock frequency attempts to read data from an electronic device running at a different clock frequency, the asynchronous nature of the transaction may cause a hazard period where the data is corrupt. Such a hazard in an asynchronous circuit is an unwanted transient precipitated by unequal paths through a combinatorial network. Even when the electronic devices are running at the same clock frequency, if the clocks are not synchronized, a hazard period may exist.

There are three typical types of hazards: dynamic, static, and essential. A dynamic hazard is a multiple momentary transient in an output signal that should have changed only once in response to the input change. A static hazard is a single momentary transient in an output signal that should have remained static in response to an input change. An essential hazard is an operational error causing a transition to an improper state in response to an input change, generally caused by an excessive delay to a feedback variable in response to an input change. Hazards can cause operational problems by causing faulty state transitions in devices and presenting undesirable glitches to any device to which the hazard is connected.

A known method used to synchronize data transfer between electronic devices clocked by different clock signals was to provide an interface with multiple banks of flip-flops. In one prior art embodiment where data was transferred from a first device to a second device, a first bank of flip-flops would be clocked by a first clock signal provided by the first device. A second and third bank of flip-flops was clocked by a second clock signal provided by the second device to complete the data transfer. It would be desirable, however, to provide a technique for data transfer employing fewer gates and fewer delays.

SUMMARY OF THE INVENTION

Circuitry according to the present invention provides a data corruption indicator circuit between a first device and a second device which operate on different clock signals. The first device provides a data signal, a data ready signal, and a first clock signal to the data corruption indicator circuit. The data corruption indicator circuit provides a clocked data ready signal which is used to internally latch a status signal into a status flip-flop within the data corruption indicator circuit. The output of a potential corruption flip-flop, internal to the data corruption indicator circuit, provides the status signal. The data corruption indicator circuit also provides a delayed data ready signal. The delayed data ready signal is used to internally latch the data signal into a data flip-flop, clock the output of the potential corruption flip-flop to a high state, and may be used as an interrupt signal to alert the second device that data is available for transfer. If the interrupt signal is utilized, sometime after the second device receives the interrupt signal, it reads the latched data signal and the status signal and provides a read data signal to the data corruption indicator circuit. The read data signal resets the potential corruption flip-flop.

The new technique can reduce the amount of time required to transfer data and does reduce the number of devices required for data transfer from that in the described prior art. By flagging corrupt data, the invention ensures that a hazard will not lead to unknowingly corrupt data.

BRIEF DESCRIPTION OF THE DRAWINGS

A better understanding of the present invention can be obtained when the following detailed description of the preferred embodiment is considered in conjunction with the following drawings, in which:

FIG. 3 is a timing diagram illustrating the relationship between the various signals provided by the asynchronous devices and the data corruption indicator circuit according to the present invention.

DETAILED DESCRIPTION OF THE PREFERRED EMBODIMENT

Figure 1:
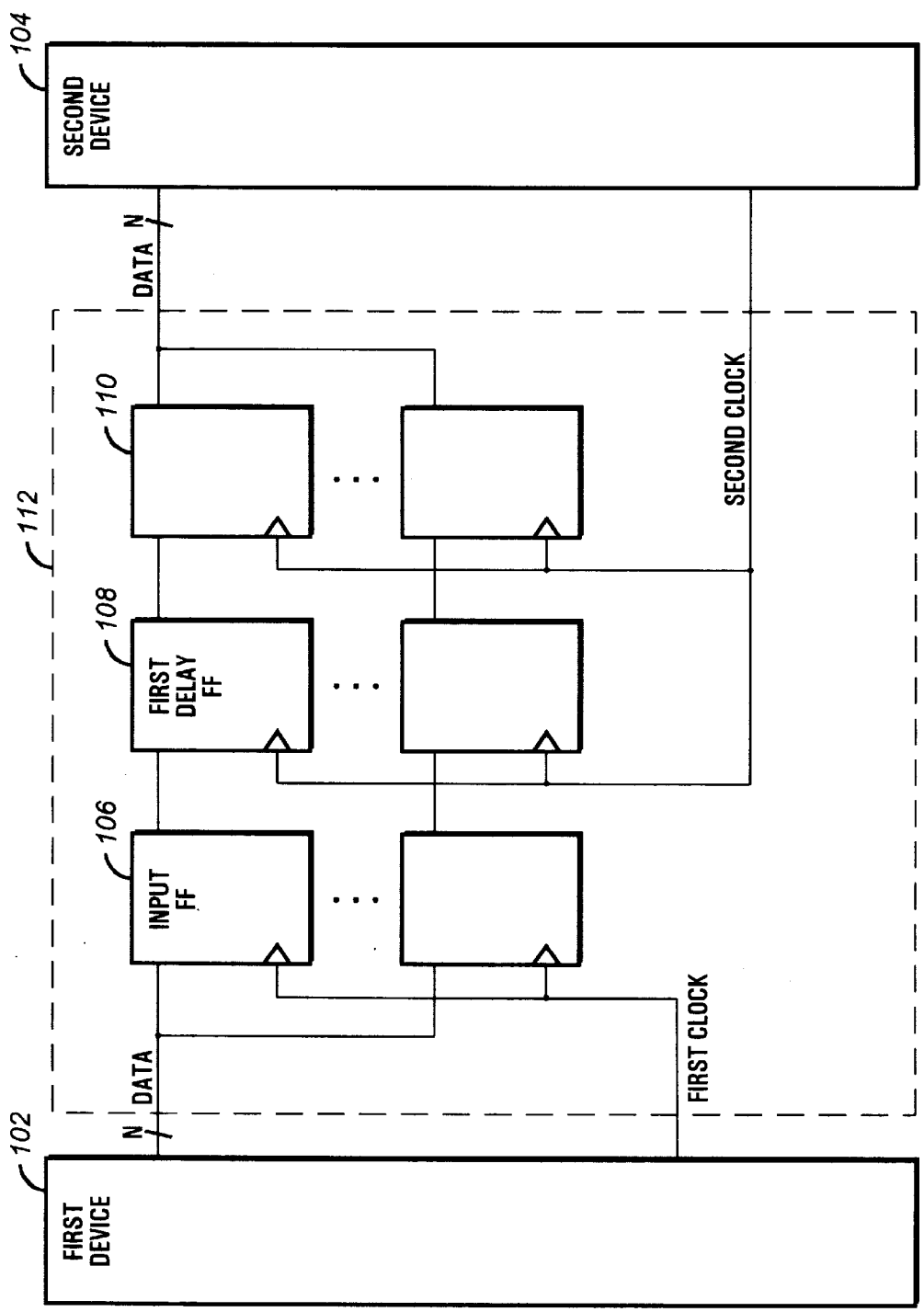
FIG. 1 is a schematic diagram of a prior art interface between two unsynchronized devices.

FIG. 1 depicts a prior art interface 112 for synchronizing data transfer between two devices clocked by different clock signals. A first device 102 provides a data signal and a first clock signal to the interface 112. A second device 104 receives the data signal and provides a second clock signal to the interface 112. Specifically, each data line is fed to the input of an input flip-flop 106. Each input flip-flop 106 is clocked by the first clock signal. The output of the input flip-flop 106 is coupled to the input of a first delay flip-flop 108. The output of the first delay flip-flop 108 is coupled to the input of a second delay flip-flop 110. The output of the second delay flip-flop 110 is coupled to a data line of the second device 104. The first delay flip-flop 108 and the second delay flip-flop 110 are clocked by a second clock signal provided by the second device 104.

Using this prior art scheme, three banks of flip-flops are required (an input bank and two delay banks). Each bank must contain the same number of flip-flops as there are data bits to be transferred.

Figure 2:
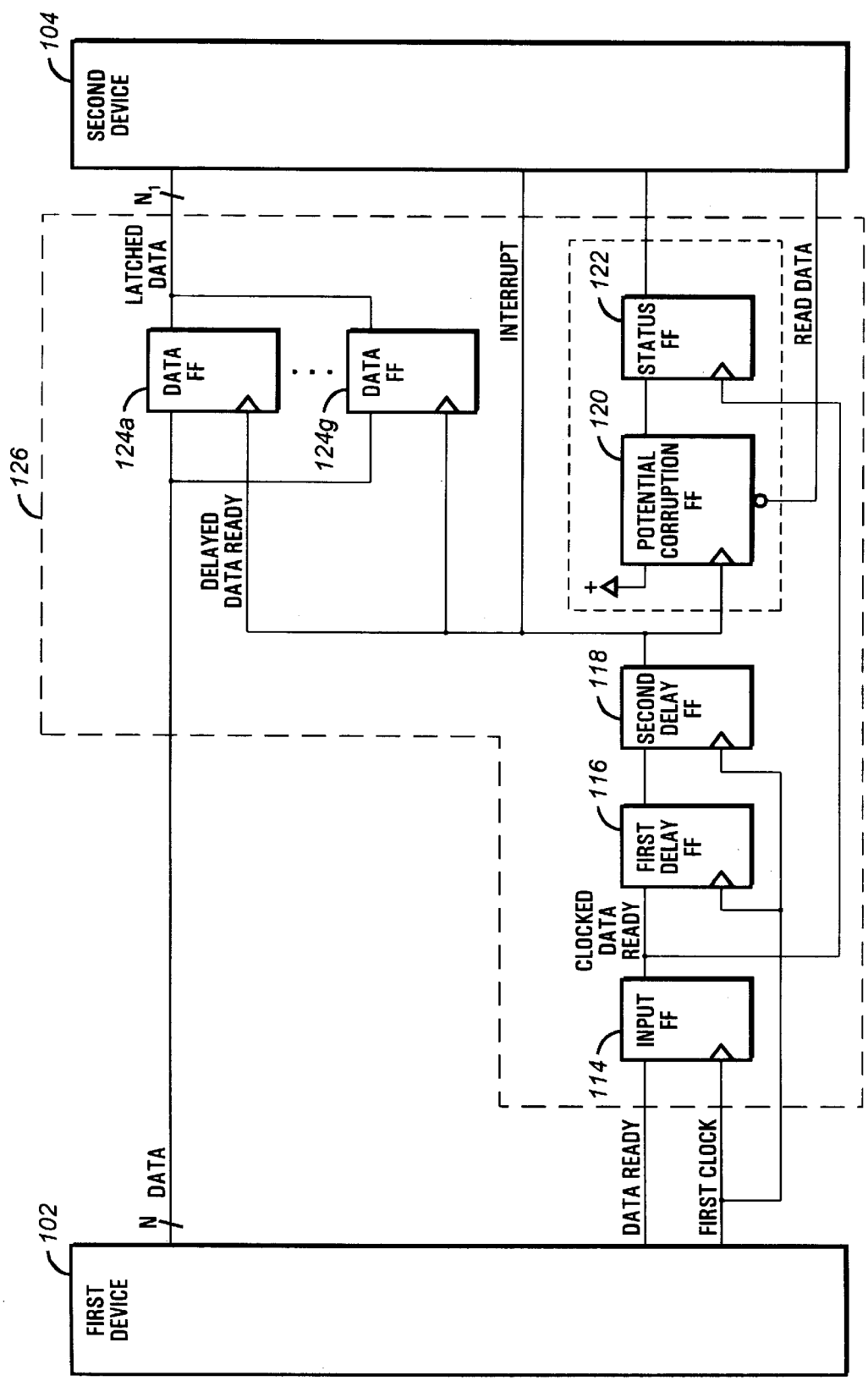
FIG. 2 is a schematic diagram illustrating a data corruption indicator circuit for data transfer between two unsynchronized devices according to the present invention.

FIG. 2 depicts a data corruption indicator circuit 126 according to the present invention. In the disclosed embodiment each flip-flop is an edge triggered D flip-flop. The number of data flip-flops 124 is dependent on the bit size of the data to be transferred from the first device 102 to the second device 104. The first device 102 provides a data signal, a data ready signal, and a first clock signal to the data corruption indicator circuit 126. The second device 104 receives a latched data signal, a status signal, and provides a read data signal to the data corruption indicator circuit 126. Specifically, each data line of the first device 102 is coupled to an input of one of the data flip-flops 124. Each output of the data flip-flops 124 is coupled to one of the data lines of the second device 104. The data ready signal from the first device is coupled to the input of an input flip-flop 114. The output of the input flip-flop 114 is coupled to an input of a first delay flip-flop 116. The output of the input flip-flop 114 also provides a clocked data ready signal. The output of the first delay flip-flop 116 is coupled to the input of a second delay flip-flop 118. The output of the second delay flip-flop 118 provides a delayed data ready signal which may be used as an interrupt signal or alternatively as a polled mode data ready indicator.

The interval between the clocked data ready signal and the delayed data ready signal must be such that a hazard cannot exist for the latched data signal and the status signal simultaneously. Depending upon the pulse width of the read data signal it could span the clocked data ready signal and the delayed data ready signal. If this occurs, the status flip-flop 122 may indicate valid data when the data is invalid because the new data could be latched before the read of the previous data has been completed. The timing between the clocked data ready signal and the delayed data ready signal must be adjusted to prevent the read data signal from spanning the signals. Additional delay flip-flops may be added, as required.

The clocked data ready signal is coupled to the clock input of a status flip-flop 122. The output of the second delay flip-flop 118, which provides the delayed data ready signal, is coupled to the clock input of a potential corruption flip-flop 120. The D input to the potential corruption flip-flop 120 is tied high. The read data signal provided by the second device 104 is coupled to the reset input of the potential corruption flip-flop 120. The delayed data ready signal is also coupled to the clock inputs of the data flip-flops 124.

In normal operating mode, when the second device 104 generates a read data signal (active low) the output of the potential corruption flip-flop 120 is reset. With the output of the potential corruption flip-flop 120 low, the input of the status flip-flop 122 is low. When a data ready signal is generated by the first device 102, a clocked data ready signal is generated by the data corruption indicator circuit 126 and the clocked data ready signal (which is coupled to the clock input of the status flip-flop 122) clocks the status flip-flop 122. When the status flip-flop 122 is clocked the output of the status flip-flop 122 will transition low, or stay low if it is already in the low state.

After a delay, the delayed data ready signal will clock the potential corruption flip-flop 120 and the data flip-flops 124. The output of the potential corruption flip-flop 120 will go high and the outputs of the data flip-flops 124 will follow their inputs. The delayed data ready signal may also be used as an interrupt signal by coupling the signal to the interrupt line of the second device 104. If the interrupt signal is utilized, sometime after receiving the interrupt signal from the data corruption indicator circuit 126 the second device 104 will respond by reading the latched data signal and the status signal and providing the read data signal to the data corruption indicator circuit 126. If the interrupt signal is not utilized, then periodically the second device 104 will read the polled mode data ready indicator. If set, device 104 will then read the latched data signal and the status signal and provide a read data signal to the data corruption indicator circuit 126. If the status signal is low the data is valid; if the status is high the data may or may not be corrupt.

The clocked data ready signal clocks the status flip-flop 122. If a read data signal has not reset the potential corruption flip-flop 120 when the status flip-flop 122 is clocked by the next clocked data ready signal the status flip-flop 122 output will go high indicating data corruption. Since new data is latched on the next delayed data ready signal, which is later in time than the next clocked data ready signal, if a read data signal is initiated to close to or during the next clocked data ready signal the status flip-flop 122 may indicate data corruption when the data is not corrupt. While a failure to indicate corrupt data is clearly unacceptable, sometimes flagging failed data as corrupt typically is acceptable.

Turning to FIG. 3, a timing diagram illustrates the relationship between the clocked data ready signal, the delayed data ready signal, the read data signal, the output of the potential corruption flip-flop 120, and the output of the status flip-flop 122. If after the data signal has been latched, a read data signal is generated in close proximity to or during the next clocked data ready signal, the output of the status flip-flop 122 is indeterminate. Even so, the data in the data flip-flops 124 is still valid, providing the time between the clocked data ready signal and the delayed data ready signal is adequate. If the output of the status flip-flop 122 is high, corrupt data is indicated even though the data is valid since the data was latched by the delayed data ready signal. That the status flip-flop 122 indicates invalid data when the data is valid illustrates the fail-safe nature of the data corruption indicator circuit. The fail-safe nature is that while the status flip-flop 122 may indicate invalid data when the data is valid, the status flip-flop 122 will not indicate valid data when the data is invalid. If the output of the status flip-flop 122 is low, valid data is indicated and recovery is not required.

If a read data signal is generated in close proximity to or during the next delayed data ready signal the previous data will be corrupt and the new data will likely be corrupt. Since the output of the potential corruption flip-flop 120 was clocked to the output of the status flip-flop 122 on the clocked data ready signal, the output of the status flip-flop 122 will be high indicating corrupt data, at which point data recovery can be initiated.

It will thus be appreciated that if the read data signal is asserted before the clocked data ready signal goes true, the output of the potential corruption flip-flop 120 is reset so when the clocked data ready signal does go true, the status flip-flip 122 clocks out a low signal indicating valid data. If the read data signal, however, is not asserted until after the clocked data ready signal goes true, the potential corruption flip-flop is not reset, so the clocked data ready signal clocks the status flip-flop 122 with a high output, indicating potentially corrupt data. Referring to the timing diagram of FIG. 3 and circuit of FIG. 2, it will be understood that the data will only necessarily be invalid when the subsequent delayed data ready signal goes true before the second device 104 reads the data in the data flip-flops 124. But by clocking a signal indicating a potential corruption out of the status flip-flop 122 based on the delayed data ready signal, the failsafe nature of the circuit becomes apparent. That is, even if a potential corruption signal clocked through the status flip-flop 122 is true, the data may or may not be invalid. However, if the potential corruption signal out of the status flip-flop 122 is low, the data will certainly be valid. Thus, valid data is assured without providing for a double buffered metastable trapping interface, but instead providing only the single data flip-flops 124.

Referencing FIG. 2, the storage means of the disclosed embodiment is achieved by latching the data signal in the data flip-flops 124 responsive to the delayed data ready signal. The delayed data ready signal is responsive to the data ready signal generated by the first device 102. The corruption means of the disclosed embodiment is achieved by latching the status signal in the status flip-flop 122 responsive to the clocked data ready signal. The status signal is provided from the output of the potential corruption flip-flop 120. The input of the potential corruption flip-flop 120 is tied high and the output of the potential corruption flip-flop 120 follows the input responsive to the delayed data ready signal. The output of the potential corruption flip-flop 120 is reset responsive to the read data signal generated by the second device. When the read data signal is received by the potential corruption flip-flop 120 for an adequate period before the clocked data ready signal is again asserted the status signal will indicate valid data. It will be obvious to one skilled in the art that the storage means and the corruption means could be derived using various circuitry other than the disclosed means without departing from the scope of the invention. For example, one can construct a D flip-flop from an RS flip-flop by coupling the input signal to the S input and by inverting the same input signal and coupling the inverted input signal to the R input.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. An electronic system for providing error free asynchronous data transfer between devices, comprising:
    a first device clocked by a first clock signal, the first device providing a data signal, a data ready signal, and the first clock signal;
    a second device clocked by a second clock signal, the second device receiving a latched data signal, and a status signal indicating potentially corrupt data, wherein the second device reads the latched data signal and the status signal, and provides a read data signal synchronized to the second clock signal; and
    a data corruption indicator circuit coupled to the first device and the second device, the data corruption indicator circuit receiving the first clock signal, the data signal, and the data ready signal from the first device, and the data corruption indicator circuit receiving the read data signal from the second device and providing the status signal and the latched data signal to the second device, the data corruption indicator circuit comprising:
        a clocking circuit receiving the data ready signal and the first clock signal, the clocking circuit providing a clocked data ready signal and a delayed data ready signal;
        a data latch circuit receiving the data signal and the delayed data ready signal, the data latch circuit providing the latched data signal by latching the data signal responsive to the delayed data ready signal; and
        a corruption latch circuit receiving the clocked data ready signal, the delayed data ready signal, and the read data signal, the corruption latch circuit providing the status signal as indicating potential corruption if the clocked data ready signal is asserted after previous data has been latched by the data latch circuit but before the previous data has been read by the second device.

2. The electronic system of claim 1, wherein the data signal is a plurality of data signals, the latched data signal is a plurality of latched data signals, and the data latch circuit is a plurality of data latch circuits.

3. The electronic system of claim 1, wherein the clocking circuit, the data latch circuit, and the corruption latch circuit of the data corruption indicator circuit are constructed with edge triggered D flip-flops.

4. The electronic system of claim 1, wherein the corruption latch circuit of the data corruption indicator circuit is constructed with two edge triggered D flip-flops.

5. The electronic system of claim 1, wherein the clocking circuit of the data corruption indicator circuit is constructed with three edge triggered D flip-flops.

6. The electronic system of claim 1, wherein the delayed data ready signal is used as an interrupt signal to the second device for signaling the second device that the data signal provided by the first device is latched and available for transfer, and wherein the second device responds to the interrupt signal by reading the latched data signal and the status signal and providing the read data signal.

7. The electronic system of claim 1, wherein the first device is an ASIC and the second device is a microprocessor.

8. The electronic system of claim 1, wherein the data latch circuit of the data corruption indicator circuit is constructed of a plurality of edge triggered D flip-flops.

9. A method of transferring data between a first device clocked by a first clock signal and a second device clocked by a second clock signal and indicating whether the data is valid, the first device providing a data signal, a data ready signal, and the first clock signal, and the second device providing a read data signal, the method comprising:
    generating a clocked data ready signal from the data ready signal;
    generating a delayed data ready signal from the clocked data ready signal;
    latching the data signal responsive to the delayed data ready signal; and
    providing a status signal indicative of potential corruption when the clocked data ready signal is asserted after previous data has been latched but before the previous data has been read.

10. The method of claim 9, further comprising the step of:
    resetting the status signal responsive to the read data signal.

11. The method of claim 9, further comprising the step of:
    providing an interrupt signal to the second device responsive to the delayed data ready signal, wherein the second device responds to the interrupt signal by reading the latched data signal and the status signal and providing the read data signal.

12. A data corruption indicator circuit for transferring data between a first device clocked by a first clock signal and a second device clocked by a second clock signal and indicating whether the data is valid, the data corruption indicator circuit receiving the first clock signal, a data signal, and a data ready signal from the first device, and the data corruption indicator circuit receiving a read data signal from the second device and providing a status signal and a latched data signal to the second device, the data corruption indicator circuit comprising:
    an input flip-flop with an input, an output, and a clock input, the clock input of the input flip-flop receiving the first clock signal, the input of the input flip-flop receiving the data ready signal, and the output of the input flip-flop providing a clocked data ready signal;
    a first delay flip-flop with an input, an output, and a clock input, the clock input of the first delay flip-flop receiving the first clock signal, the input of the first delay flip-flop being coupled to the output of the input flip-flop;
    a second delay flip-flop with an input, an output, and a clock input, the clock input of the second delay flip-flop receiving the first clock signal, the input of the second delay flip-flop being coupled to the output of the first delay flip-flop, and the output of the second delay flip-flop providing a delayed data ready signal;

a potential corruption flip-flop with a true input, an output, a reset input, and a clock input, the reset input of the potential corruption flip-flop receiving the read data signal, the clock input of the potential corruption flip-flop receiving the delayed data ready signal, wherein the output of the potential corruption flip-flop is set when the clock input is clocked by the delayed data ready signal if the read data signal is high;

a status flip-flop with an input, an output, and a clock input, the clock input of the status flip-flop receiving the clocked data ready signal, the input of the status flip-flop being coupled to the output of the potential corruption flip-flop, and the output of the potential corruption flip-flop providing the status signal to the second device; and a data flip-flop with an input, a clock input, and an output, the input of the data flip-flop receiving the data signal from the first device, the clock input of the data flip-flop receiving the delayed data ready signal, and the output of the data flip-flop providing the latched data signal to the second device.

13. The data corruption indicator circuit of claim 12, wherein the flip-flops are edge triggered D flip-flops.

14. A data corruption indicator circuit for transferring data between a first device clocked by a first clock signal and a second device clocked by a second clock signal and indicating whether the data is valid, the data corruption indicator circuit receiving the first clock signal, a data signal, and a data ready signal from the first device, and the data corruption indicator circuit receiving a read data signal from the second device and providing a status signal and a latched data signal to the second device, the data corruption indicator circuit comprising:

a clocking circuit receiving the data ready signal and the first clock signal, the clocking circuit providing a clocked data ready signal and a delayed data ready signal;

a data latch circuit receiving the data signal and the delayed data ready signal, the data latch circuit providing the latched data signal, the data latch circuit latching the data signal responsive to the delayed data ready signal; and a corruption latch circuit receiving the clocked data ready signal, the delayed data ready signal, and the read data signal, the corruption latch circuit providing the status signal as indicating potential corruption if the clocked data ready signal is asserted after previous data has been latched by the data latch circuit but before the previous data has been read by the second device.

15. The data corruption indicator circuit of claim 14, wherein the data signal is a plurality of data signals, the latched data signal is a plurality of latched data signals, and the data latch circuit is a plurality of data latch circuits.

16. The data corruption indicator circuit of claim 14, wherein the clocking circuit, the data latch circuit, and the corruption latch circuit are constructed with edge triggered D flip-flops.

17. The data corruption indicator circuit of claim 14, wherein the corruption latch circuit is constructed with two edge triggered D flip-flops.

18. The data corruption indicator circuit of claim 14, wherein the clocking circuit is constructed with three edge triggered D flip-flops.

19. The data corruption indicator circuit of claim 14, wherein the delayed data ready signal is used as an interrupt signal to the second device for signaling the second device that the data signal provided by the first device is latched and available for transfer, and wherein the second device responds to the interrupt signal by reading the latched data signal and the status signal and providing the read data signal.

20. The data corruption indicator circuit of claim 14, wherein the first device is an ASIC and the second device is a microprocessor.

21. The data corruption indicator circuit of claim 14, wherein the data latch circuit is constructed of a plurality of edge triggered D flip-flops.

\* \* \* \* \*